United States Patent
Kapp

[11] 3,905,335
[45] Sept. 16, 1975

[54] NASAL AIR FILTER

[76] Inventor: Gerald J. Kapp, 14147 Euclid Ave., East Cleveland, Ohio 44112

[22] Filed: Mar. 21, 1974

[21] Appl. No.: 453,206

[52] U.S. Cl. ........................................... 128/140 N
[51] Int. Cl.² ........................................ A62B 23/06
[58] Field of Search ............ 128/140 N, 140 R, 146, 128/205, 206, 145 A, 132 R; 2/2.1 R, 2 R; 9/310 A, 400

[56] References Cited
UNITED STATES PATENTS

| | | | |
|---|---|---|---|
| 701,538 | 6/1902 | Carence | 128/140 N |
| 2,672,138 | 3/1954 | Carlock | 128/140 N |
| 2,717,596 | 9/1955 | Knight | 128/152 |
| 3,415,246 | 12/1968 | Hill | 128/132 R |
| 3,722,509 | 3/1973 | Nebel | 128/140 N |
| 3,800,791 | 4/1974 | Visor | 128/152 |

FOREIGN PATENTS OR APPLICATIONS

| | | | |
|---|---|---|---|
| 471,119 | 1/1951 | Canada | 128/152 |

*Primary Examiner*—Richard A. Gaudet
*Assistant Examiner*—Henry J. Recla
*Attorney, Agent, or Firm*—Donnelly, Maky, Renner & Otto

[57] ABSTRACT

Nasal air filter includes a separate filter member for each nostril in the shape of a tube or cylinder having an outer diameter somewhat smaller than the nostril openings, and thin, readily yieldable flanges at one or both ends of the cylinders which conform to the walls of the nostrils to prevent air from passing between the nostril walls and filter members and assist in retaining the filter members in place while still permitting ready insertion and removal of the filter members from the nostrils. Irritation of the soft interconnecting tissue between the nostrils is prevented by eliminating the flanges on the filter members in that region. The device may also be readily modified for use as a nose plug to keep water out of the nose of a swimmer by eliminating the filter material within the cylinder and inserting a solid plug into the lower open end of the cylinder which may be retained in place using a suitable adhesive.

7 Claims, 5 Drawing Figures

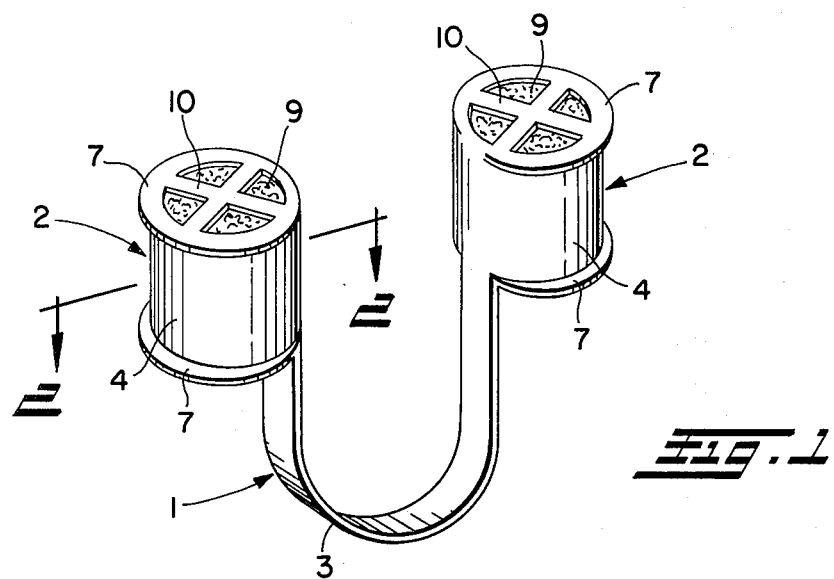
Fig. 1
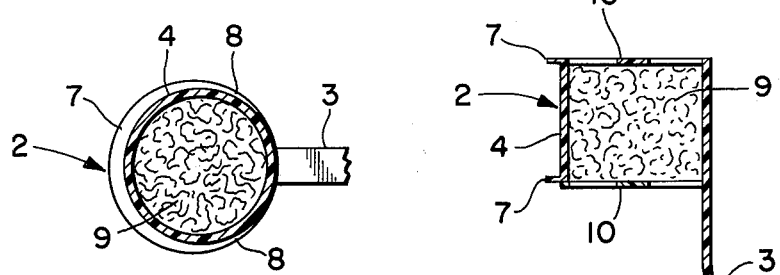
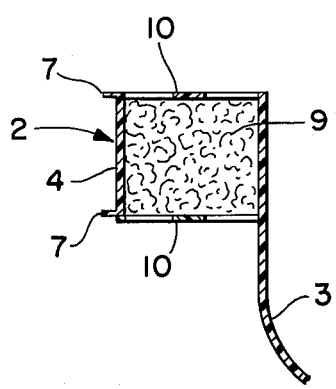
Fig. 2
Fig. 3
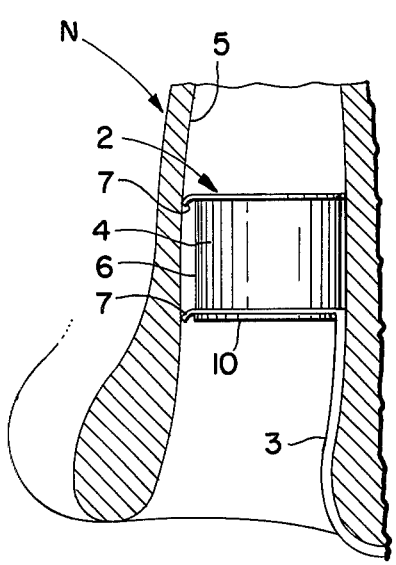
Fig. 4
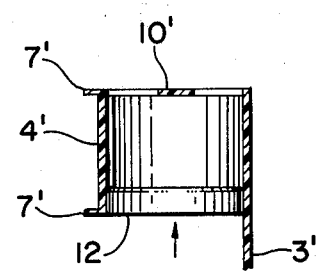
Fig. 5

NASAL AIR FILTER

This invention relates generally as indicated to a nasal air filter for use in filtering the air passing through the nostrils.

A principal object of this invention is to provide a filter of the type indicated which is very effective and can readily be worn with no discomfort whatever.

Another object is to provide such a filter which is almost entirely concealed and practically invisible when worn.

Still another object is to provide such a filter which is securely retained in place when worn and yet can easily be inserted into the nostrils and removed therefrom.

Yet another object is to provide such a filter which will not cause irritation or adhere to the nose and will readily fit nostrils of different sizes.

A further object is to provide such a filter which is very inexpensive, making it readily disposable after use.

Another object is to provide such a filter which, with minimum alteration or modification, can be used as a nose plug to keep water out of the nose of a swimmer.

These and other objects of the present invention may be achieved by providing individual filter members for each nostril in the shape of a tube or cylinder made of a suitable plastic or rubber-like material having an outer diameter somewhat less than the size of the nostril openings, with thin, flexible flanges at one or both ends of the cylinder which readily conform to the walls of the nostrils to prevent air from passing between the nostril walls and outer walls of the filter members.

Because of the yieldable nature of the larger diameter flanges on the filter members, the filter members may be inserted into noses of different sizes and the flanges will still conform to the walls of the nostrils to prevent air from passing around the filter members. The flanges also assist in retaining the filter members within the nostrils and yet will not interfere with the insertion or removal of the filter members from the nostrils due to the yieldable nature of the flanges as aforesaid.

Irritation of the more sensitive interconnecting tissues between the nostrils is also avoided by eliminating the flanges on the filter members in that region and providing curved portions on the ends of the flanges where they terminate. The flanges may be molded integral with the cylinders, and an integral connecting strip or bridge may also extend between a pair of such filter members to facilitate insertion and removal of the filter members from the nostrils.

Any suitable filtering material may be used and retained within the filter members as by providing a lattice or screen on both ends of the filter members.

The device may also readily be modified for use as a plug to keep water out of the nose of a swimmer, it only being necessary to eliminate the filter material and remove the lattice at the outer end of the cylinders and insert a solid plug into the open end of the cylinders and retained in place using a suitable adhesive.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a perspective view of a preferred form of nasal air filter constructed in accordance with this invention;

FIG. 2 is a transverse section through one of the filter members of FIG. 1, taken on the plane of the line 2—2 thereof;

FIG. 3 is a longitudinal section through one of such filter members;

FIG. 4 is an enlarged schematic diagram illustrating the disposition of one such filter member when inserted within the nostril of a person; and FIG. 5 is a longitudinal section through a modified form of filter member in which a solid plug has been substituted for the filter material for use in keeping water out of the nose of a swimmer.

DESCRIPTION OF THE PREFERRED EMBODIMENTS

Referring now in detail to the drawings and initially to FIG. 1 thereof, there is shown a preferred form of nasal air filter 1 constructed in accordance with the present invention. The filter desirably includes a pair of individual filter members 2, each adapted to be inserted in a nostril of a person for use in removing dirt particles and the like from the air, and connected together by a connecting strip or bridge 3. Each filter member 2 consists of a tube or cylinder 4 which may be molded out of a suitable plastic or rubber-like material such as polyethylene that will not irritate or adhere to the nose and of course is also non-toxic and otherwise safe to use. The material from which the cylinders 4 are made is also desirably readily yieldable to avoid injury to the nose, and the outer diameter of the cylinders are desirably somewhat less than the size of the nostril openings in which they are to be inserted for ease of insertion and removal therefrom.

In use, to prevent flanges passing between the nostril walls 5 and outer walls 6 of the cylinders 4, flanges 7 are desirably provided at both ends of the cylinders. The flanges 7 may be molded integral with the cylinders 4 and are quite thin and flexible so that they will readily conform to the walls 5 of the nostrils N despite some variation in the size of the nostril openings as shown schematically in FIG. 4. As an example, the flanges 7 may be in the order of .002 inch thick and project radially outwardly beyond the outer diameter of the cylinders 4 approximately one-eighth to one-fourth inch. Moreover, the outer diameter of the cylinders 4 themselves may be of different sizes to fit different size nostrils and may range anywhere from three-sixteenths inch to five-eighths inch in diameter.

While it is preferable that flange s 7 be provided at both ends of the cylinders 4 to assure against air passing between the cylinders 4 and walls 5 of the nostrils N and assist in retaining the filter members in place preventing inadvertent removal of the filter members from the nostrils, it will be apparent that a single flange 7 may be provided at one end only of the cylinders if desired without departing from the scope of the present invention.

Although not absolutely necessary, it is also preferable that the flanges 7 be eliminated in the region of the cylinders 4 which comes into contact with the more sensitive interconnecting tissue between the nostrils to avoid irritation to the tissue which might otherwise be caused by the flanges. Also, the ends of the connecting strip or bridge 3 are desirably an integral extension of the cylinders in the region of the cylinders which come into contact with the interconnecting tissue between the nostrils to avoid irritation thereto. The end portions 8 of the flanges 7 are desirably gradually tapered or curved where they terminate as shown in FIG. 2 to avoid any protrusions or sharp edges which might cause irritation to the nose.

The integral connecting strip or bridge 3 which extends between the two filter members 2 facilitates insertion of the filter members sufficiently far into the nostrils that they are almost entirely concealed and practically invisible when worn except for the connecting strip which is very small and hardly noticeable. The connecting strip 3 may also be made of clear plastic or a flesh colored material to make it even less noticeable, and may be grasped to facilitate removal of the filter members from the nostrils after use.

Contained within the filter members 2 is a filter material 9 such as shown in FIGS. 2 and 3. Any suitable material may be used as the filter material, for example, cellulose acetate, cotton, charcoal, or various combinations thereof. The desired type and quantity of filtering material is inserted within the filter members and retained in place as by providing a lattice or screen 10 on both ends of the cylinders 4. One of the lattice or screen closures 10, for example, the inner one, may be molded integral with the cylinders, whereas the other lattice is desirably molded separately from the cylinders and subsequently secured in place using a suitable adhesive after the filtering material has been placed in the cylinders. Making the inner lattice closures integral with the cylinders has the advantage that there is no danger of the inner lattice closures coming loose and either they or the filter material being forced further up into the nose.

Making the other lattice closures 10 a separate piece not only facilitates assembly of the filter material within the filter members but also permits substitution of a solid plug 12 for the filter material and separate lattice closures as shown in FIG. 5 thereby permitting the device to be readily converted for use as a nose plug in keeping water out of the nose of a swimmer. The solid plug 12 may either be retained in place within the cylinders 4' by friction or with the use of a suitable adhesive.

From the foregoing, it will now be apparent that the nasal air filter of the present invention is of a very simple and inexpensive construction which nevertheless is very effective in filtering out dirt particles and other pollutants from the air being breathed. Because of the construction of the filter, it will readily fit into noses of various sizes without inadvertently falling out or permitting air to pass between the filters and the walls of the nostrils. The filter has also been found ideal for use by people with heart trouble who go outdoors in cold weather, in that the filter assists in keeping the nose warm so that it is better able to warm the air passing through the nose before it reaches the lungs.

It has been found that the filter of the present invention will accommodate most filtering materials and will prevent most dust and other particles from passing through the nose into the lungs. Charcoal may also be used as the filtering material which has been found to be effective in neutralizing certain gases. Also, with minimum alterations or modifications, the filter of the present invention can also readily be used as a nose plug to keep water out of the nose of a swimmer.

The embodiments of the invention in which an exclusive property or privilege is claimed are defined as follows:

1. A nasal air filter comprising a pair of cylinders each having radially projecting yieldable flange means at least at one end thereof for yielding engagement with the nostril walls, said flange means being relatively thin in cross section and extending around the entire periphery of said cylinders in eccentric relation to the longitudinal axes of said cylinders wherein sections of the periphery of said flanges nearest each other are coincident with the periphery of said cylinders, said flange means having end portions where said flange means terminate which are gradually tapered to avoid any protrusions or sharp edges which might cause irritation to the nostrils, a filter material contained within said cylinders, and an interconnecting piece extending between one end of each cylinder to facilitate insertion and removal of the filter from the nostrils.

2. The filter of claim 1 wherein said radially projecting yieldable flange means are provided at both ends of said cylinders for yielding engagement with the nostril walls.

3. The filter of claim 1 wherein there is a lattice closure at least at the other end of said cylinders to retain said filter material within said cylinders.

4. The filter of claim 1 wherein said flange means are approximately .002 inch thick and project radially outwardly from said cylinders a maximum distance of approximately one-eighth to one-fourth inch.

5. The filter of claim 1 wherein said interconnecting piece has ends which are an integral extension of said cylinders in the region of said cylinders which come into contact with the interconnecting tissue between the nostrils to avoid irritation to such interconnecting tissue.

6. A device for insertion within the nostrils of a person comprising a pair of cylinders each having radially projecting yieldable flange means at least at one end thereof for yielding engagement with the nostril walls, said flange means being relatively thin in cross section and extending around the entire periphery of said cylinders in eccentric relation to the longitudinal axes of said cylinders wherein sections of the periphery of said flanges nearest each other are coincident with the periphery of said cylinders, said flange means having end portions where said flange means terminate which are gradually tapered to avoid any protrusions or sharp edges which might cause irritation to the nostrils, and an interconnecting piece extending between one end of each cylinder to facilitate insertion and removal of the cylinders from the nostrils.

7. The device of claim 6 wherein said cylinders have openings therethrough, and plugs are inserted into one end of said cylinders to block said openings.

* * * * *